United States Patent [19]

Parker et al.

[11] Patent Number: 4,844,593

[45] Date of Patent: Jul. 4, 1989

[54] OPTICAL FEEDBACK ISOLATOR

[75] Inventors: David R. Parker; John H. Gliever, both of San Jose, Calif.

[73] Assignee: Hewlett-Packard Company, Palo Alto, Calif.

[21] Appl. No.: 194,630

[22] Filed: May 16, 1988

[51] Int. Cl.$^4$ .......................... G02B 5/30; G02B 27/28
[52] U.S. Cl. ....................................... 350/400; 350/320
[58] Field of Search .................. 350/400, 401, 320; 356/351, 356, 358

[56] References Cited

U.S. PATENT DOCUMENTS 3,635,552  1/1972  de Lang ............................... 356/351

OTHER PUBLICATIONS

Brown, N. "Frequency Stabilized Lasers: Optical Feedback Effects," *Applied Optics*, vol. 20, No. 21, pp. 3711–3714, Nov. 1981.

Primary Examiner—Bruce Y. Arnold
Attorney, Agent, or Firm—James M. Williams

[57] ABSTRACT

Method and apparatus for isolating optical feedback in a laser interferometer having a laser light source from which a linear polarized outgoing laser beam of certain polarization orientation is derived. The interferometer also redirects the outgoing laser beam to form a return laser beam directed to a receiver. The outgoing laser beam and the return laser beam are physically close and are substantially parallel. The linearly polarized outgoing laser beam is converted to circular polarization. A portion of the circularly polarized return laser beam directed toward the laser light source is converted back to linear polarization with polarization orientation orthogonal to the polarization orientation of the outgoing laser beam. A portion of the circularly polarized return laser beam directed toward the receiver is converted back to linear polarization with polarization orientation being substantially the same as the polarization orientation of the outgoing laser beam. The portion of the return laser beam with polarization orientation orthogonal to the polarization orientation of the outgoing laser beam is directed away from the laser light source, and the portion of the return laser beam with polarization orientation substantially the same as the polarization orientation of the outgoing laser beam is directed toward the receiver.

10 Claims, 2 Drawing Sheets

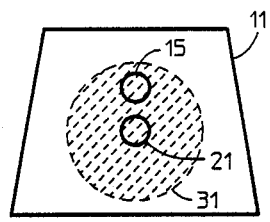
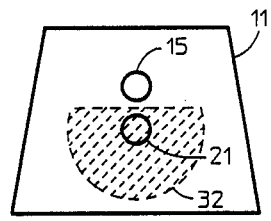
FIG. 3  FIG. 4
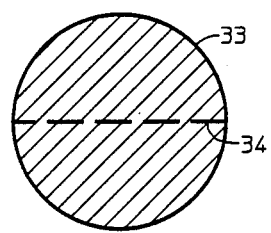
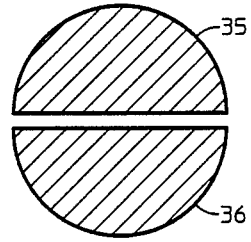
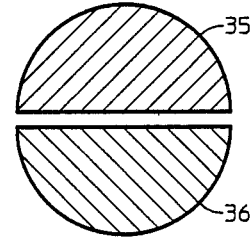
FIG. 5  FIG. 6  FIG. 7
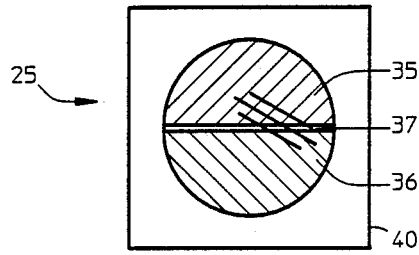
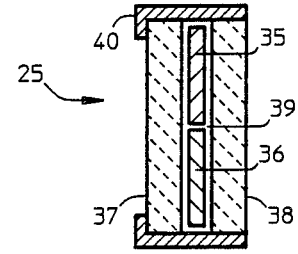
FIG. 8  FIG. 9

OPTICAL FEEDBACK ISOLATOR

This invention relates to an optical feedback isolator for use with a laser interferometer.

BACKGROUND AND SUMMARY OF THE INVENTION

The problem of optical feedback affecting lasers and laser interferometers has been known for at least two decades and is noted and described in a paper by N. Brown in the November 1981 issue of Applied Optics, Vol. 20, No. 21 at pages 3711 to 3714. When the configuration of laser interferometer optics and the distance between those optics becomes such that laser light, which originates from the cavity inside the laser, becomes re-directed and re-enters the laser cavity, then optical feedback can occur. Such feedback then detrimentally affects the properties of the original laser beam, possibly including but not limited to, its intensity, its frequency, and its phase. When the distance between the optics is relatively long—for example, 50 feet or more—then, due to the natural divergence of the laser light beam and/or slight beam redirection caused by changes in atmospheric refractive index, the problem often becomes severe.

Some kinds of polarization isolation have been proposed to mitigate optical feedback in some interferometer systems by suppressing reflections which directly retrace the path of the outgoing beam; however, they are not suitable for use with laser interferometers such as the modified Michelson interferometer, which uses offset outgoing and returning beams. The paper by Brown suggests some such approaches, and approaches with other kinds of laser interferometers have been described in a paper by C. N. Man, et al. in The Journal of Physical Electronic Science Instrumentation (J. Phys. E. Sci. Instrum.), Vol. 11, 1978, pages 19-21. All these approaches fail when applied to laser interferometers such as the modified Michelson interferometer, because they block the entire return beam.

Two principal mechanisms which can bring about optical feedback are: (1) diffraction and (2) atmospheric beam deviation. They both arise from the fact that in typical configurations of interferometer optics, there frequently exists, originating from the laser cavity, an outgoing laser beam which is positioned close to and parallel to a returning laser beam traveling in the opposite direction, often but not always aiming toward a receiver. In such an optical configuration, diffraction can bring about optical feedback, as follows: If the distance that these parallel beams travel is sufficient, the natural divergence of the returning laser light due to diffraction may cause the diameter of the returning laser beam to increase to the point that it partly or entirely encompasses the outgoing beam. When this occurs, the portion of the returning beam which is sufficiently collinear with the outgoing beam may travel along the path of the outgoing beam until it re-enters the laser cavity. When the intensity and the alignment of this re-entered light are sufficient, this light interferes with the electromagnetic fields inside the laser cavity; this condition is known as optical feedback. The consequences are that the properties of the outgoing laser beam are then degraded, as described above.

In the same optical configuration, atmospheric beam deviation can bring about optical feedback as follows: When refractive index fluctuations occur in the region traversed by the laser beams, outgoing or returning, the beams may be temporarily angularly deviated. For example, such index fluctuations may arise routinely in air as a result of turbulence, temperature gradients, pressure gradients, humidity gradients, concentrations of chemical vapors, or any combination of these effects. When the returning laser beam sufficiently deviates from its intended path, some of its intensity may re-enter into the laser cavity and may cause optical feedback. The longer the beam path, the less angular deviation that is required to cause re-entry into the cavity; also, the larger the returning beam's diameter, which increases with distance due to the aforementioned divergence, the less angular deviation that is required to cause the same effect. Consequently, when the distance between optics is relatively large, the problem may become severe.

The result of optical feedback is modulation of the output beam from the laser cavity, causing frequency and intensity fluctuations in the output laser beam. If these fluctuations cause errors in the interferometer measurement system, the measurement may cease entirely or an error message may be generated.

An object of the invention is to prevent the optical feedback by preventing a suitably directed returning beam from reaching the laser cavity and influencing the emitted laser light beam, while allowing the returning beam to be used in making the actual measurement for which the interferometer is used.

Another object of the invention is to prevent optical feedback due to the returning beam while introducing no substantial degradation of any optical properties of the portions of the returning beam needed to make a measurement, for example, the portions desired to reach any receiver. Such optical properties may include but are not limited to, intensity, frequency, and phase.

The optical feedback isolator of this invention functions in conjunction with the polarization effects of the interferometer optics, which include a polarizing beamsplitter to supply a linearly-polarized laser beam of certain polarization orientation, and a retroreflector to redirect the laser beam to the beamsplitter and reverse the handedness of the circularly-polarized light.

The optical feedback isolator comprises a pair of quarter-wave retarders.

The first retarder is inserted into the path of the outgoing laser beam, between a polarizing beamsplitting means and a retroreflecting means, with its fast axis at either +45 or −45° with respect to the polarization plane of the incident beam. This converts the outgoing beam's linear polarization into circular polarization of a certain handedness. The returning beam will now be circularly-polarized with opposite handedness compared to the outgoing beam, due to the handedness reversal caused by the retroreflecting means. If any of the returning light is positioned such that it passes back through the first retarder, its polarization becomes linear with an orientation that is orthogonal to that of the outgoing beam. When it reaches the polarizing beamsplitting means, this returning light will not be transmitted toward the source of the outgoing beam, but will be reflected in some other direction. Thus, this portion of the returning beam will not reach the laser cavity, and optical feedback is thereby prevented.

A second retarder is inserted into the path of the returning laser beam, also between the polarizing beamsplitting means and the retroreflecting means, with its fast axis orthogonal to that of the first retarder. The consequence of this is that the polarization of the returning beam will be converted to linear in the original orientation of the outgoing beam. Note that this portion of the returning beam cannot cause optical feedback because it is not coaxial with any portion of the outgoing beam. When this returning light reaches the polarizing beamsplitting means, it will follow the original path, i.e., to the receiver, just as it would in the absence of any retarders at all. Thus, the isolator of the invention leaves this portion of the returning beam substantially unaffected in its optical properties.

In this invention, the first retarder and the second retarder are mutually shaped and positioned such that: 1) the entire outgoing light beam passes through the first retarder only; and 2) the portion of the returning light beam intended for the receiver passes back through the second retarder only, and 3) the undesired portion of the returning light beam, which is to be optically isolated from reaching the laser cavity, passes back only through the first retarder. Generally, if the first and second retarders are contiguous and coplanar, then most configurations which meet the requirement 1) will automatically satisfy requirement 3). In many configurations, the optimum location of the pair of retarders is as close as possible to the laser cavity while remaining between the beamsplitter means and a retroreflector means.

BRIEF DESCRIPTION OF THE DRAWINGS

FIG. 3 is a diagrammatic view of the front of a laser head, illustrating how a spread retroreflected beam can reenter the laser cavity through the exit aperture.

FIG. 4 is a similar view showing the effect of the present invention in restricting the retroreflected beam and preventing its reentry into the cavity, while permitting its entry into the receiver aperture.

FIG. 5 is a top plan view of a circular quarter-wave retarder plate made of mica, showing the fast axis at 45 degrees.

FIG. 6 is a similar view with the retarder plate of FIG. 5 cut in half.

FIG. 7 is a similar view with the lower half of the retarder plate flipped over 180 degrees.

FIG. 8 is a top plan view of the two semi-circular retarder plates of FIG. 7 sandwiched between a pair of protective windows and then assembled into a protective metal holder.

FIG. 9 is a view in elevation and in section of the complete assembly of FIG. 8.

DESCRIPTION OF A PREFERRED EMBODIMENT

Figure 1:
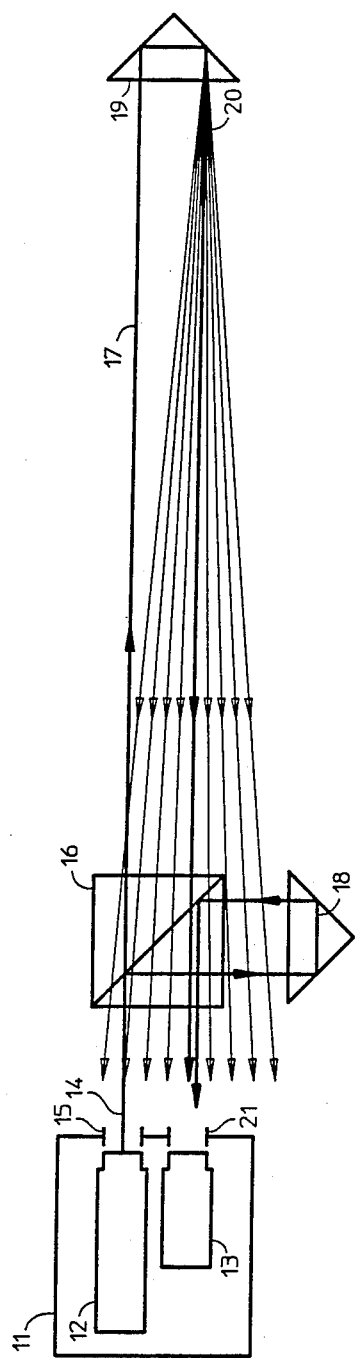
FIG. 1 is a diagrammatic view of a laser interferometer system which is experiencing the optical feedback problem, due to returning laser light re-entering the laser cavity.

FIG. 1 is a diagrammatic view of a modified Michelson laser system which is experiencing the optical feedback problem described above. An interferometer system may comprise a laser head 11 which contains a light-generating laser cavity 12 and a receiver 13. A laser beam 14 may be emitted through an exit aperture 15 and enter a polarizing beamsplitter 16 which separates the laser beam 14 into an outgoing measurement beam 17 having one linear polarization and a reference beam 18 having orthogonal linear polarization. The outgoing beam 17 reflects from the retroreflector 19 and emerges as a returning beam 20, having the same linear polarization. When the distance from the laser head 11 to the retroreflector 19 is long, for example, 165 feet, then the outgoing beam 17 and the returning beam 20 spread or diverge with distance, due to diffraction; this is represented for simplicity as multiple diverging rays forming the returning beam 20. Most of the returning beam 20 passes back through the beamsplitter 16 and reaches the front of the laser head 11. A portion of the returning beam 20 enters a receiver aperture 21 and reaches the receiver 13, as desired. However, another portion of the returning beam 20 re-enters the exit aperture 15 and re-enters the laser cavity 11. Optical feedback may occur, therefore. Thus, FIG. 1 represents the prior art and the problem.

Figure 2:
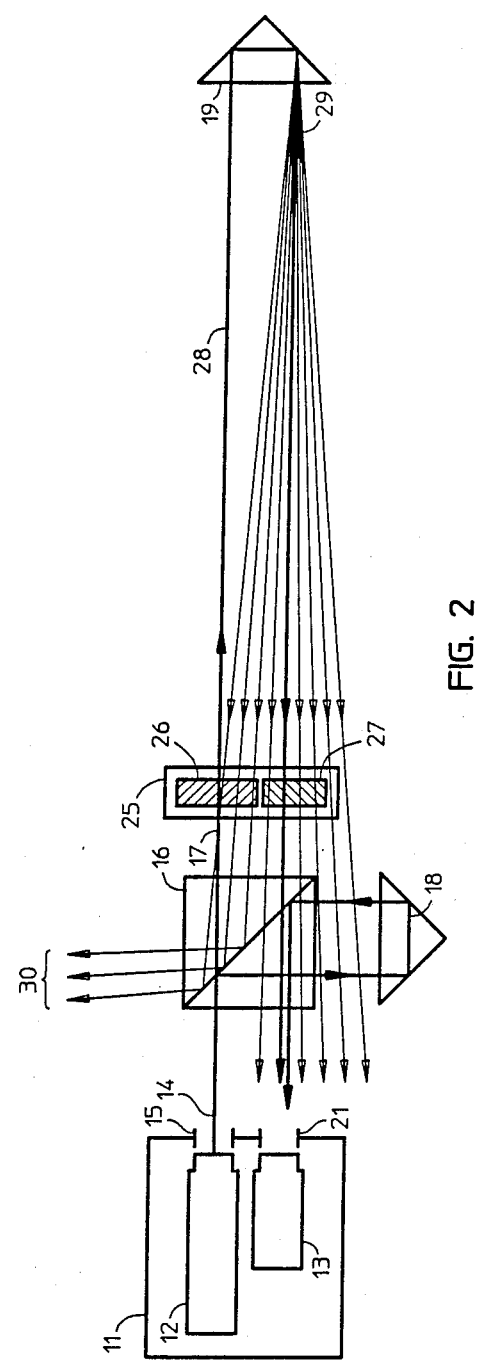
FIG. 2 is a diagrammatic view of a similar laser interferometer system incorporating the principles of the present invention to suppress optical feedback while permitting the desired returning light to travel without impediment.

FIG. 2 is a similar diagrammatic view of a modified Michelson laser interferometer system which utilizes the principles of the present invention to suppress optical feedback without detriment to any desired returning beam. The optical configuration in FIG. 2 differs from that of FIG. 1 only by the addition of an optical feedback isolator 25, which comprises two quarter-wave retarders 26 and 27.

Quarter-wave retarders convert incident linearly-polarized light into transmitted circularly-polarized light of a selected handedness when the orientation of the incident polarization is appropriate. Such retarders are reciprocal devices, in the sense that they will also convert incident circularly-polarized light into transmitted linearly-polarized light whose polarization orientation is determined by the retarder orientation. According to customary usage, the orientation of the retarders may be be specified with regard to either a "fast axis" or an orthogonal "slow axis" of the retarder.

When the outgoing beam 17 emerges from the beamsplitter 16, it has a certain linear polarization, for example, vertical. This beam 17 passes through the first quarter-wave retarder 26, whose fast axis is at +45 or −45 degrees to the incident polarization, and emerges as a beam 28 with a certain circular polarization, for example, left-handed. The beam 28 then enters the retroreflector 19 which reverses the handedness of circular polarization as it reflects. A returning beam 29, which is circularly polarized, now has the opposite handedness, for example, right-handed. Part of the returning beam 29 passes back through the first retarder 26, thereby becoming linearly polarized with an opposite orientation to the outgoing beam 17; this part of the beam 29 is then reflected by the beamsplitter 16, instead of being transmitted, and emerges as a harmless beam 30. Laser light can no longer re-enter the laser cavity 12. Optical feedback is thereby prevented. Another part of beam 29 passes through the second quarter-wave retarder 27, whose fast axis is orthogonal to that of the the first retarder 26, thereby becoming linearly polarized with original polarization of the outgoing beam 17; this part of the beam 29 then can pass directly though the beamsplitter 16, then through the receiver aperture 21, and finally reach the receiver 13 substantially without detriment.

The ability of the optical feedback isolator 25 to prevent any laser light from re-entering the laser cavity 12 is clearly seen by comparing FIG. 3 and FIG. 4. Both figures show a diagrammatic view of the front of the laser head 11, along with the exit aperture 15 and the receiver aperture 21. In FIG. 3, the shaded circular area 31 represents the returning laser beam which reaches the laser head 11 when no optical feedback isolator is utilized; this corresponds to the configuration in FIG. 1. In FIG. 4, the shaded nearly semi-circular area 32 represents the returning laser light which reaches the laser head 11 when an optical feedback isolator is utilized; this corresponds to the configuration in FIG. 2. Clearly, optical feedback is prevented because the optical feedback isolator effectively screens out the light which might re-enter the laser cavity.

The optical feedback isolator 25 may be constructed as illustrated in FIGS. 5–9. FIG. 5 shows a circular quarter-wave retarder plate 33, which may be made of a thin sheet of mica of proper thickness. The fact axis of the retarder 33 lies at 45 degrees to the diametrical line 34. The retarder 33 is then cut in half along the diametrical line 34, to form two semi-circular retarders 35 and 36, as shown in FIG. 6. As shown in FIG. 7 one of the semi-circular retarders 36 is then flipped over 180 degrees, which causes its fast axis to be orthogonal to the fast axis of the other retarder 35. These two semi-circular retarders 35 and 36 may then be permanently sandwiched between a pair of antireflection coated windows 37 and 38 having substantially no wedge, and being secured with optical cement 39. Lastly, the resulting sandwich assembly of elements 35, 36, 37, 38, 39 may be mounted in a protective metal holder 41. The completed optical feedback isolator 25 is depicted in plan view in FIG. 8 and cross-sectional view in FIG. 9.

It will be realized by workers skilled in the art that the construction depicted in FIGS. 5–9 is only a preferred way of providing two suitably-shaped, practical retarders at a reasonable manufacturing cost. Numerous departures from this construction are possible which still function essentially identically. For example, the use of mica is not exclusive; other retarder materials such as quartz will work. Also, the use of windows is optional, since they serve only to protect the mica which is typically fragile. The antireflection coatings are an optional enhancement as well; and they may be applied directly to the mica if the glass windows are omitted.

Moreover, to those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

What is claimed is:

1. An optical feedback isolator for a laser interferometer having a laser light source, means for forming a linearly polarized outgoing laser beam of certain polarization orientation, and means for redirecting the outgoing laser beam to form a return laser beam directed to a receiver, said redirecting means effective to reverse the handedness of circularly polarized light, wherein the outgoing laser beam and the return laser beam are physically close and substantially parallel, said optical feedback isolator comprising:
   a first quarter-wave retarder located in the path of the outgoing laser beam and positioned to intercept any portion of the return laser beam directed toward the laser light source, with its fast axis at 45 degrees to the polarization orientation of the outgoing beam, whereby the return laser beam is prevented from reaching the laser light source; and
   a second quarter-wave retarder located in the path of the return laser beam and not in the path of the outgoing laser beam, with its fast axis orthogonal to the fast axis of the first quarter-wave retarder, whereby the return laser beam is allowed to reach the receiver.

2. The isolator of claim 1 wherein said first and second quarter-wave retarders are sandwiched between a pair of optically transmitting windows.

3. An optical feedback isolator for a laser interferometer having a laser light source for generating a laser beam and sending it through polarizing beamsplitting means for supplying a linearly-polarized outgoing laser beam of certain polarization orientation to retroreflecting means for redirecting the outgoing laser beam in the opposite direction as a returning laser beam passing back through the beamsplitting means and simultaneously said means for redirecting being effective to reverse the handedness of circularly-polarized light, wherein said outgoing laser beam and said returning laser beam are physically close and substantially parallel, comprising:
   a first quarter-wave retarder, with a fast axis at 45 degrees to the incident linear polarization, located between the beamsplitting means and the retroreflecting means in the path of the outgoing laser beam travelling toward said retroreflecting means, and
   a second quarter-wave retarder, with a fast axis orthogonal to the fast axis of the first quarter-wave retarder, located between the beamsplitting means and the retroreflecting means in the path of the returning laser beam only, travelling from said retroreflecting means back toward the beamsplitting means.

4. The isolator of claim 3 wherein said first and second quarter-wave retarders are sandwiched between a pair of optically transmitting windows.

5. The isolator of claim 4 wherein said windows are coated with an antireflection coating.

6. The isolator of claim 3 wherein said first and second quarter-wave retarders form part of an assembly in which they are sandwiched between a pair of optically transmitting windows coated with an antireflection coating and are supported by a rigid holder.

7. An optical feedback isolator for a laser interferometer having a laser light source for generating a laser beam and sending it through polarizing beamsplitter means for sending one portion of said beam to a fixed retroreflector as a linearly-polarized laser beam of certain polarization orientation and sending another portion of said beam, linearly polarized orthogonally to said certain polarization orientation and passing to a movable retroreflecting means for redirecting its portion of the laser beam in the opposite direction passing back through the beamsplitting means and simultaneously to convert its portion of the laser beam from circularly-polarized light of one handedness to circularly-polarized light of the opposite handedness, wherein an outgoing laser beam portion and a returning laser beam portion are physically close and substantially parallel, said optical feedback isolator comprising:
   a first quarter-wave retarder, with a fast axis at 45 degrees to incident linear polarization, located between the beamsplitting means and the movable retroreflecting means in the path of the portion of the laser beam travelling toward said retroreflecting means, and a second quarter-wave retarder, with a fast axis orthogonal to the fast axis of the first quarter-wave retarder, located between the beamsplitting means and the movable retroreflecting means in the path of the returning laser beam only, travelling from said retroreflecting means back toward the beamsplitting means.

8. A method for isolating optical feedback in a laser interferometer having a laser light source, means for forming a linearly polarized outgoing laser beam of certain polarization orientation, and means for redirecting the outgoing laser beam to form a return laser beam directed to a receiver, having reversed polarization orientation, wherein the outgoing laser beam and the return laser beam are physically close and substantially parallel, said method comprising:

converting the linearly polarized outgoing laser beam into a circularly polarized beam, converting the portion of the circularly polarized return laser beam directed toward the laser light source into linear polarization with polarization orientation orthogonal to the polarization orientation of the outgoing laser beam, converting the portion of the circularly polarized return laser beam directed toward the receiver into linear polarization with polarization orientation substantially the same as the polarization of the outgoing laser beam, directing the portion of the return laser beam with polarization orientation orthogonal to the polarization orientation of the outgoing laser beam away from the laser light source; and directing the portion of the return laser beam with polarization orientation substantially the same as the polarization orientation of the outgoing laser beam toward the receiver.

9. A method for isolating optical feedback in a laser interferometer that generates a laser beam, sends it through a polarizing beamsplitter, sends one portion of said beam to a fixed retroreflector and a second portion to a movable retroreflector, both portions being linearly-polarized and of opposite linear polarization orientations, redirecting both portions of the laser beam in the opposite direction from the respective retroreflectors back to said beamsplitter, while an outgoing laser beam and a returning laser beam are physically close and substantially parallel, comprising the steps of:

converting the linearly-polarized laser light from the beamsplitter into a circular polarization as it travels to the movable retroreflector, and reversing the handedness of said circularly-polarized light as it travels through the movable retroreflector, and converting the portion of the oppositely circularly polarized light from a movable retroreflector directed toward the laser light source into linear polarization with polarization orientation orthogonal to the polarization orientation of the outgoing laser beam, converting the portion of the oppositely circularly polarized light from a movable retroreflector directed toward the receiver into linear polarization with polarization orientation substantially the same as the polarization of the outgoing laser beam, directing the portion of the returning laser beam with polarization orientation orthogonal to the polarization orientation of the outgoing laser beam away from the laser light source; and directing the portion of the returning laser beam with polarization orientation substantially the same as the polarization orientation of the outgoing laser beam toward the receiver.

10. A method for isolating optical feedback in a laser interferometer having a laser light source for generating a laser beam and sending it through a polarizing beamsplitting means to supply a linearly-polarized laser beam of certain polarization orientation, and passing to a retroreflecting means to redirect the laser beam in the opposite direction back to the beamsplitting means and simultaneously capable of converting circularly-polarized light of one handedness to circularly-polarized light of the opposite handedness, wherein an outgoing laser beam and a returning laser beam are physically close and substantially parallel, comprising converting the linearly-polarized laser light from the beamsplitting means into a circular polarization as it travels to the retroreflecting means, and reversing the handedness of said circularly-polarized light as it travels through the retroreflecting means, and converting the portion of the oppositely circularly polarized light from a movable retroreflector directed toward the laser light source into linear polarization with polarization orientation orthogonal to the polarization orientation of the outgoing laser beam, converting the portion of the oppositely circularly polarized light from a movable retroreflector directed toward the receiver into linear polarization with polarization orientation substantially the same as the polarization of the outgoing laser beam, directing the portion of the returning laser beam with polarization orientation orthogonal to the polarization orientation of the outgoing laser beam away from the laser light source; and directing the portion of the returning laser beam with polarization orientation substantially the same as the polarization orientation of the outgoing laser beam toward the receiver.

* * * * *